UNITED STATES PATENT OFFICE.

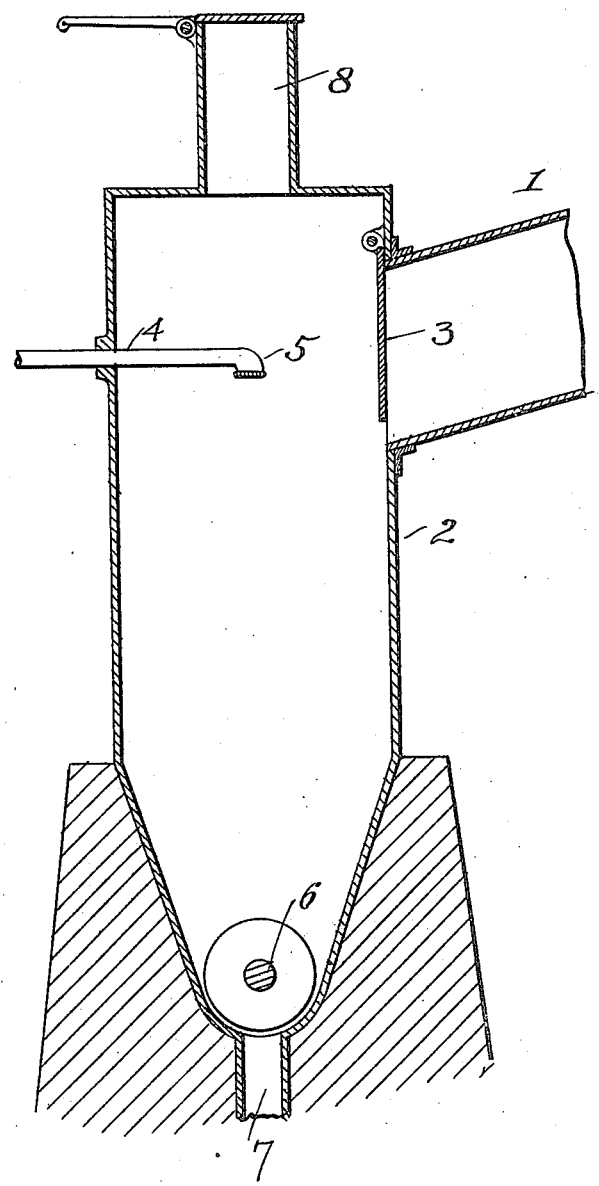

HENRY J. HABER, OF CLEVELAND, OHIO, ASSIGNOR OF THIRTY PER CENT TO PAUL NORTH, THIRTY PER CENT TO GEORGE M. POTTER, AND TEN PER CENT TO WORTHINGTON HOYT, ALL OF CLEVELAND, OHIO.

METHOD OF TREATING CHARCOAL.

1,407,531.      Specification of Letters Patent.     Patented Feb. 21, 1922.

Application filed April 18, 1918. Serial No. 229,463.

*To all whom it may concern:*

Be it known that I, HENRY J. HABER, a citizen of the United States, residing at Cleveland, in the county of Cuyahoga and State of Ohio, have invented a certain new and useful Improvement in Methods of Treating Charcoal, of which the following is a full, clear, and exact description.

It is the purpose and object of this invention to provide a method by which charcoal subsequent to its being charred may be quenched, and a smoldering combustion stopped, or where the charcoal is to form the basis of what is known in the trade as heat treating compounds, to impregnate the charcoal with a solution carrying suitable chemical substances which may be desirable to associate with the charcoal for the purpose.

Reference may be had to the accompanying drawings forming a part of this specification, in which the figure represents in sectional elevation an apparatus in which the method herein disclosed may be carried out.

The method starts with a heated mass of charcoal either where the mass of charcoal is directly delivered from a charring furnace, or where the charcoal has been heated prior to using my method. And preferably the charcoal utilized in carrying out my invention is in pieces of small size which in the case of impregnating charcoal directly with chemical substances in making heat treating compound is approximately the size of a pea or bean, known in the trade as No. 4 charcoal.

The charcoal in heated condition is delivered through a tubular member 1 into the interior of a receptacle 2. The end opening of the tubular member 1 is substantially closed by means of a swinging door 3, this door being so mounted as to hang in closed position by gravity. As the charcoal mass is forced slowly through the tubular member 1 the door 3 is deflected from its vertical position, allowing the charcoal to pass into the container 2, but the weight of the door is sufficient to restrain the passage of the charcoal, thereby packing the same adjacent the exit end of the tubular member 1 which prevents to a large extent the escape of steam through the tubular member 1.

As the charcoal comes into the receptacle or container 2, it is contacted by a spray of water, in which there is dissolved or in which there is in suspension in finely divided form the chemical substances with which it is desired to impregnate the charcoal.

The solution just mentioned is delivered to the interior of the receptacle through a pipe 4 having a suitable nozzle 5.

As the charcoal is in heated condition, the pores of the charcoal are filled with air in expanded condition, and upon being contacted by the cold solution carrying the chemical substances, the air in the pores contracts, thereby causing a much more efficient taking up of the solution with its chemicals than could be effected by treatment of cold charcoal, either by a spray or by a soaking process.

The charcoal as it falls after entering the receptacle 2, is constantly receiving treatment by the solution in spray form contacting with it, and when the charcoal has fallen to the bottom of the receptacle 2, it is slowly removed therefrom by means of a screw conveyor which is indicated at 6.

At the lower end of the receptacle 2 there is a pipe 7 which is a drain pipe and serves to conduct away the excess solution which has not been taken up by the charcoal.

The charcoal is slowly removed from the receptacle 2, so as to afford ample time for the solution containing the chemical to come in contact with all the particles of charcoal.

Naturally in the process the solution striking the charcoal causes the evaporation, at least in part, of the water, which evaporation forms clouds of condensed moisture which may be allowed to pass off from the receptacle by means of the vent opening 8 at the upper part of the receptacle 2.

When the charcoal emerges from the receptacle 2 it has usually been sufficiently quenched below the temperature at which combustion may take place.

It will be quite obvious from the foregoing description that if the charcoal be desired for other purposes than that of making heat treating compounds, that instead of supplying water having a solution or suspension chemical substances, clear water may be supplied free from chemicals. Charcoal delivered to the chamber 2, quenched and cooled in the manner which has been described, is removed and handled as desired.

Charcoal which is removed from the receptacle 2 subsequent to the treatment with my process in a manner to be suitable for producing heat treating compound is allowed to stand so that the moisture may evaporate therefrom, and the chemical substances are deposited in the pores of and upon the outer surface of the charcoal.

Having described my invention, I claim:

1. The method of continuously quenching charcoal which consists in supplying charcoal in heated condition to a closed receptacle, spraying the charcoal with a cooling solution, and continuously removing the charcoal from the lower portion of the receptacle after treatment.

2. The method of continuously quenching charcoal which consists of supplying charcoal in heated condition to a closed receptacle, continuously moving the charcoal through the closed receptacle and spraying the charcoal with a cooling solution.

3. The method of treating charcoal which consists in supplying charcoal in heated condition to a closed receptacle, bringing said charcoal into contact while in heated condition with a fluid carrying desired chemical substances and removing the charcoal from the receptacle.

4. The method of treating charcoal which consists in supplying charcoal in heated condition to a closed receptacle, spraying the charcoal with a fluid containing suitable chemical substances and removing the charcoal from the receptacle.

In testimony whereof, I hereunto affix my signature.

HENRY J. HABER.